United States Patent [19]

Nishijima et al.

[11] Patent Number: 4,777,543
[45] Date of Patent: Oct. 11, 1988

[54] TRACKING CORRECTION FOR A ROTARY HEAD BY DETECTION OF THE MINIMUM SIGNAL LEVEL

[75] Inventors: Hideo Nishijima; Kaneyuki Okamoto, both of Katsuta; Katsuhiko Goto, Mito; Hiroshi Usami, Katsuta, all of Japan

[73] Assignee: Hitachi, Ltd., Tokyo, Japan

[21] Appl. No.: 898,539

[22] Filed: Aug. 21, 1986

[30] Foreign Application Priority Data

Aug. 28, 1985 [JP] Japan ................ 60-187274

[51] Int. Cl.$^4$ ............ G11B 5/588; G11B 15/473
[52] U.S. Cl. ........................... 360/70; 360/77
[58] Field of Search ............... 360/70, 77, 73

[56] References Cited

U.S. PATENT DOCUMENTS

| | | | |
|---|---|---|---|
| 3,585,291 | 6/1971 | Yamakawa | 360/70 |
| 4,104,684 | 8/1978 | Wakari et al. | 360/70 |
| 4,143,405 | 3/1979 | Kubota | 360/77 |
| 4,229,773 | 10/1980 | Sakamoto | 360/70 |
| 4,613,914 | 9/1986 | Kobori et al. | 360/70 |

Primary Examiner—Raymond F. Cardillo
Assistant Examiner—David L. Robertson
Attorney, Agent, or Firm—Antonelli, Terry & Wands

[57] ABSTRACT

In an automatic tracking system for a magnetic recording and reproducing apparatus wherein tracking is controlled so as to increase an amplitude of a reproduced signal which is delivered from a rotary head for reproducing a track recorded by a helical scan system, the amplitudes of the reproduced signal are detected at a plurality of points of time within one rotational cycle of the rotary head, and the tracking is controlled so as to increase a minimum value among the detected values at the plurality of points of time.

2 Claims, 4 Drawing Sheets

TRACKING CORRECTION FOR A ROTARY HEAD BY DETECTION OF THE MINIMUM SIGNAL LEVEL

BACKGROUND OF THE INVENTION

The present invention relates to an auto-tracking system for a helical scan type magnetic recording and recording apparatus. More particularly, it relates to an auto-tracking systen for a magnetic recording and reproducing apparatus which affords the optimum reproduced output in spite of the curve of a recording track and the curve of the scanning locus of a reproducing head.

In a helical scan type magnetic recording and reproducing apparatus for domestic use (hereinbelow, termed 'VTR') tracking control has heretofore been performed in order for a video head to precisely scan a recording track on a magnetic tape. As tracking control means therefor, a system is known wherein the rotational speed of a capstan is controlled so that a control signal reproduced from the magnetic tape and the phase of rotation of the video head may become predetermined values.

Various dispersion factors, however, make it necessary to vary the optimum value of the phase between the tape and the head so as to attain compatibility. For this reason, an auto-tracking system which automatically adjusts the optimum value is required.

Such an auto-tracking system has hitherto been proposed in various forms. An example is an auto-tracking system wherein, as disclosed in the official gazette of Japanese Patent Application Laid-open No. 54-41114, a tracking control signal is detected using the envelope level of a reproduced signal, and the traveling phase of a magnetic tape is controlled with the detected signal so as to maximize the envelope level.

The auto-tracking system provides features that the reproduced signal envelope level is periodically sampled, that the difference between the current sampled value and the last sampled value is detected and that the traveling phase of the magnetic tape is changed according to the detected difference so as to shift the video head in a predetermined amount in the widthwise direction of the track. When the reproduced signal envelope level increases owing to the successive changes of the tracking phase, this phase is further changed in the same direction, and when the envelope level turns to decrease, the phase is changed in the opposite direction, whereby the maximum envelope output point is automatically searched for.

In such a prior-art auto-tracking system, the curve of the track and the curve of the scanning locus of the video head are not taken into consideration. Accordingly, in the mode of reproduction in the case where the curve of the track of a recorded video tape differs from the curve of the scanning locus of a video head in a VTR for reproducing the tape (in other words, where recording and reproduction are performed with apparatuses different from each other), the signal-to-noise ratio degrades especially in a part of a screen (noise bars appear in some cases). That is, when the track curve 16 in the recording apparatus and the scanning locus curve 17 of the video head 4 in the reproducing apparatus are in the opposite directions as illustrated in FIGS. 8 and 9, noise develops in the lower part (or upper part) of a television screen because the prior-art system performs the control with the sampled value which is the mean value of reproduced signal envelope levels over a whole predetermined period or which is a reproduced signal envelope level preferentially extracted in correspondence with the central part of the television screen.

SUMMARY OF THE INVENTION

An object of the present invention is to provide an auto-tracking system for a magnetic recording and reproducing apparatus which can establish a tracking state most suited to practical use and which can prevent noise from appearing on a television screen.

In order to accomplish the object, according to the present invention, a plurality of points within one predetermined cycle of a reproduced signal envelope are detected. The minimum value among the plurality of detected values is used as the sampled value of the current tracking state. A tracking phase is controlled so that the sampled value may become the maximum.

DETAILED DESCRIPTION OF THE PREFERRED EMBODIMENT

Now, an embodiment of the present invention will be described with reference to FIGS. 1-7.

Figure 1:
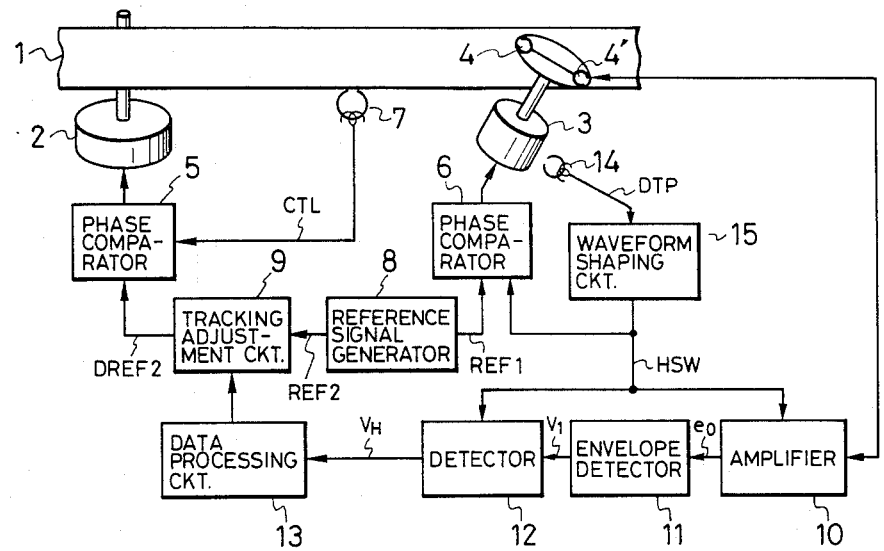
FIG. 1 is a block diagram showing an embodiment of an automatic tracking system according to the present invention.

FIG. 1 is a block diagram showing one embodiment of an auto-tracking system for a magnetic recording and reproducing apparatus according to the present invention, in which numeral 1 designates a magnetic tape, numeral 2 a capstan motor, numeral 3 a cylinder motor, numerals 4 and 4' video heads, numerals 5 and 6 phase comparators, numeral 7 a control head, numeral 8 a reference signal generator, numeral 9 a tracking adjustment circuit, numeral 10 an amplifier, numeral 11 an envelope detector, numeral 12 a detector for detecting the minimum value within a predetermined range, numeral 13 a data processing circuit, numeral 14 a rotational phase detector, and numeral 15 a waveform shaping circuit.

Referring to the figure, a pulse (DTP) which is provided from the rotational phase detector 14 and which expresses the rotational phase of the cylinder motor 3 is processed by the waveform shaping circuit 15, whereby a switching signal HSW for the video heads 4 and 4' is formed. One cycle of this signal HSW denotes one revolution of the video head 4 or 4'. The head switching signal HSW is supplied to the phase comparator 6 and is compared in phase with a reference signal $REF_1$ the reference signal generator 8, and the resulting phase difference signal is supplied to the cylinder motor 3. In consequence, the cylinder motor 3 is rotated in phasic synchronism with the reference signal $REF_1$.

On the other hand, a control signal CTL recorded on the magnetic tape 1 is detected by the control head 7, and it is supplied to the phase comparator 5 and is compared in phase with a delayed reference signal $DREF_2$ from the tracking adjustment circuit 9. A phase difference signal from the phase comparator 5 is supplied to the capstan motor 2. As a result, the capstan motor 2 is controlled and driven so that the control signal CTL and the delayed reference signal $DREF_2$ may fall into phasic synchronism.

Next, a method of forming the delayed reference signal $DREF_2$ be explained. The cycle of a reference signal $REF_2$ produced by the reference signal generator 8 has a fixed phasic relation with the reference signal $REF_1$ cycle is equal to the rotational cycle of the cylinder motor 3. It is the function of the tracking adjustment circuit 9 to properly delay the reference signal $REF_2$. Here, the variation of the delay time T of this reference signal makes it possible to alter the phasic relation in the widthwise direction of a video track 16 between this video track recorded on the magnetic tape 1 shown in FIG. 2 and the scanning locus 17 of the video head 4. Accordingly, after the outputs of the video heads 4 and 4' are amplified by the amplifier 10, the output levels thereof are detected by the envelope detector 11. Further, the minimum value of the outputs $V_1$ of the envelope detector 11 within a predetermined interval (for example, one rotational cycle of the cylinder motor 3) is detected by the detector 12. Upon receiving the output $V_H$ of the detector 12, the data processing circuit 13 controls the delay time T of the tracking adjustment circuit 9.

In operation, the data processing circuit 13 first latches the value of the output $V_H(t=t_1)$ of the detector 12 at the current point of time ($t_1$) and subsequently increases ($T_0+\Delta T$) or decreases ($T_0-\Delta T$) the delay time T of the tracking adjustment circuit 9 by $\Delta T$. Then, it decides whether the value of the resulting output $V_H(t=t_2)$ of the detector 12 has increased or decreased relative to the latched $V_H(t=t_1)$ value. If the result of the decision is the increase, the delay time T is further increased ($T_0+2\Delta T$) or decreased ($T_0-2'\Delta T$) by $\Delta T$ in the same tendency. In contrast, if $V_H(T=T_2)$ has decreased relative to $V_H(t=t_1)$, the direction of increase or decrease is inverted, and the delay time is decreased ($T_0+\Delta T-\Delta T=0$) or increased ($T_0-\Delta T+\Delta T=T_0$) The value of the output $V_H(t=t_3)$ of the detector 12 obtained at this time and the value of the output $V_H(t=t_2)$ are repeatedly compared again, and similar operations are performed.

By repeating such a series of operations, the output $V_H$ of the detector 12 is automatically set nearly to the maximum value.

Figure 2:
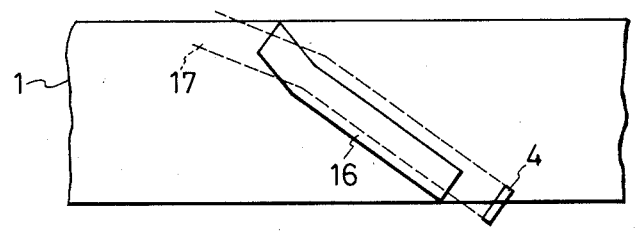
FIG. 2 is a diagram showing an example of a magnetic tape pattern.
Figure 3:
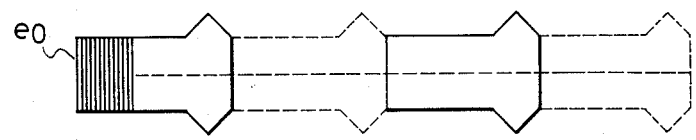
FIG. 3 is a waveform diagram showing the output waveform of a video head.

That is, even when the curves of the recorded video track 16 and the scanning locus 17 of the reproducing video head are in the opposite directions to each other as shown in FIG. 2 and the output $e_0$ of the amplifier 10 accordingly becomes as shown in FIG. 3, the tracking can be controlled according to the present invention to prevent noise from appearing at a part of a screen.

Figure 4:
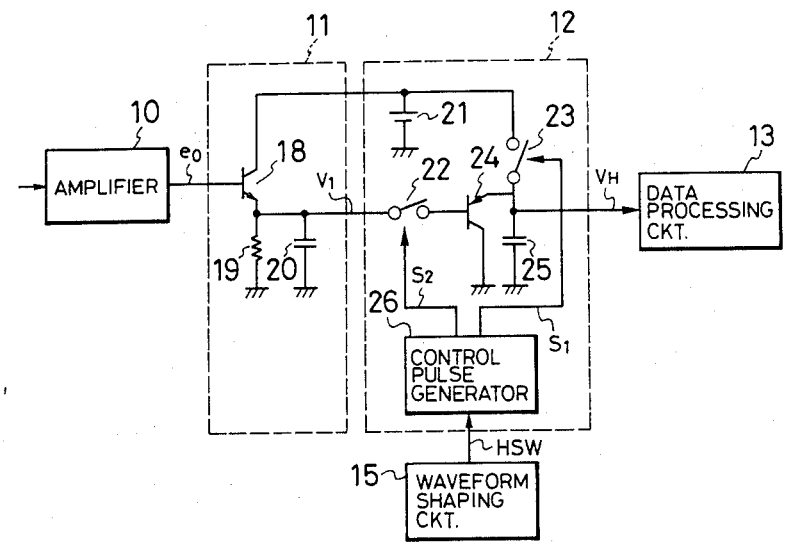
FIG. 4 is a block diagram showing practicable examples of an envelope detector and a minimum value detector in the embodiment of FIG. 1.
Figure 5:
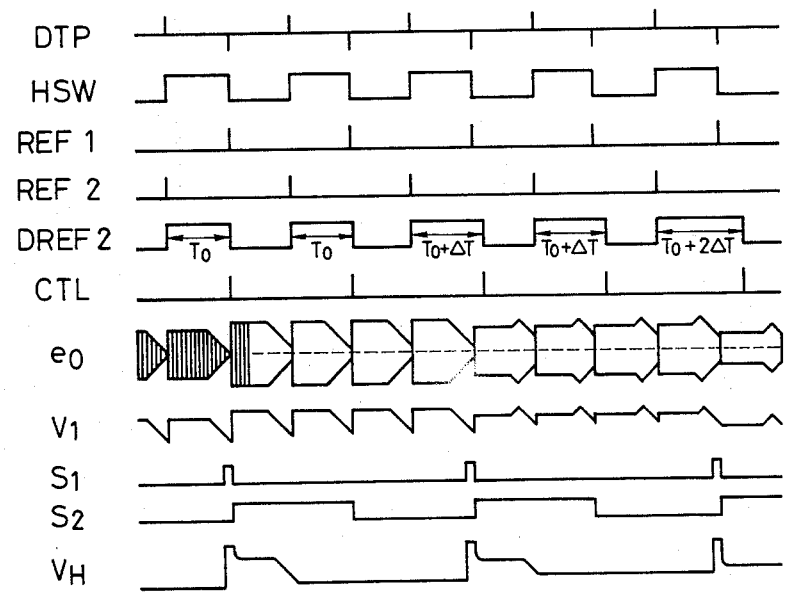
FIG. 5 is a diagram of waveforms at principal parts in the arrangement of FIG. 4.

Next, a practicable example of arrangement of the envelope detector 11 as well as the detector 12 for use in the present invention is shown in FIG. 4, and the operating waveforms thereof are shown in FIG. 5. In these figures, portions identical and functions equivalent to those of FIGS. 1 and 2 are indicated by the same symbols. Numeral 18 designates a transistor, numeral 19 a resistor, numeral 20 a capacitor, numeral 21 a voltage source, numerals 22 and 23 switching circuits, numeral 24 a transistor, numeral 25 a capacitor, and numeral 26 a control pulse generator.

In FIG. 4, the transistor 18, the resistor 19 and the capacitor 20 constitute the envelope detector 11. As illustrated in FIG. 5, this envelope detector 11 provides the waveform $V_1$ obtained by detecting the high level side of the output $e_0$ of the amplifier 10. Subsequently, owing to the detector 12 which is constructed of the switching circuits 22, 23, the transistor 24 and the capacitor 25, the minimum value of the waveform $V_1$ obtained with the envelope detector 11, within a predetermined period (the high level interval of a waveform $S_2$ in FIG. 5) is held in the capacitor 25. More specifically, the control pulse generator 26 properly divides the frequency of the output of the waveform shaping circuit 15 (in FIG. 5, it divides the frequency in two) and generates control pulses $S_1$ and $S_2$ for driving the respective switching circuits 23 and 22, in synchronism with the divided frequency. Thus, the switching circuit 23 is brought into its 'ON' state to charge the capacitor 25 up to the voltage value of the voltage source 21 owing to the high level interval of the control pulse $S_1$. During this interval, the switching circuit 22 is in its 'OFF' state. Next, the control pulse $S_1$ has a low level to bring the switching circuit 23 into its 'OFF' state, and the control pulse $S_2$ has a high level interval to bring the switching circuit 22 into its 'ON' state. Thus, the capacitor 25 is discharged down to a potential which is higher than the output waveform $V_1$ of the envelope detector 11 by the base-emitter voltage of the transistor 24. In this way, the switching circuit 22 is kept in the 'ON' state during the high level interval of the control pulse $S_2$ (in FIG. 5, during one cycle of the head switching signal HSW), whereby the minimum value of the waveform $V_1$ during this interval is held in the capacitor 25. This waveform is illustrated at $V_H$ in FIG. 5. The waveform $V_H$ thus obtained is fed into the data processing circuit 13 of succeeding stage at a proper timing.

Next, the operation of a practicable example of the data processing circuit 13 as well as the tracking adjustment circuit 9 shown in FIG. 6 will be described with reference to FIG. 7.

Figure 6:
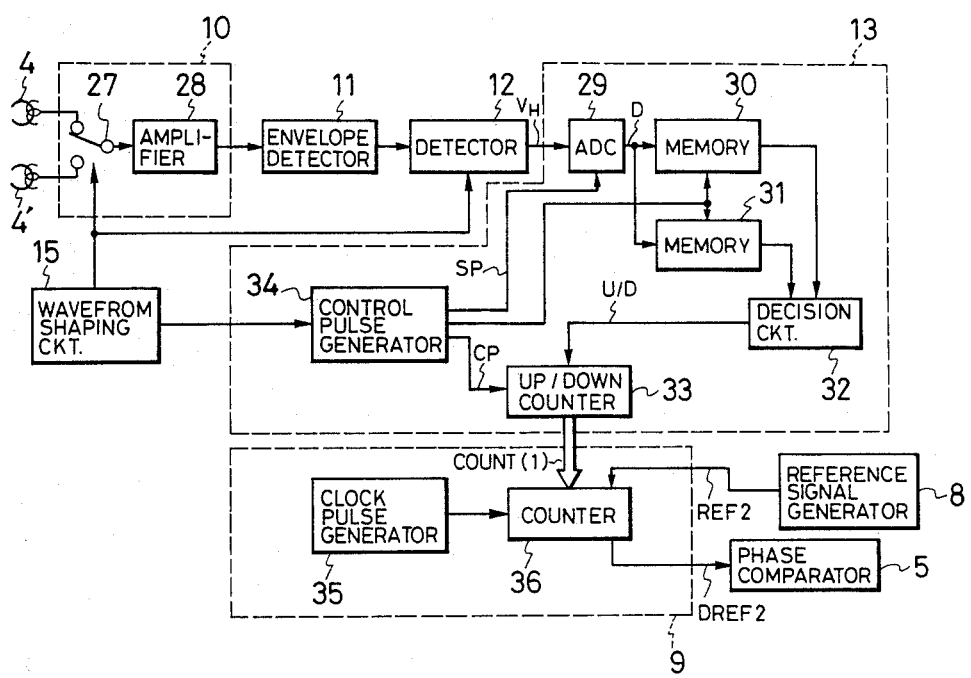
FIG. 6 is a block diagram showing practicable examples of a data processing circuit and a tracking adjustment circuit in the embodiment of FIG. 1.

In FIG. 6, portions identical and functions equivalent to those of FIGS. 1, 2 and 4 are indicated by the same symbols. Numeral 27 designates a switching circuit, numeral 28 an amplifier, numeral 29 an analog-to-digital converter (hereinbelow, abbreviated to 'ADC'), numerals 30 and 31 memories, numeral 32 a magnitude decision circuit, numeral 33 an up/down counter, numeral 34 a control pulse generator, numeral 35 a clock pulse generator, and numeral 36 a counter.

Figure 7:
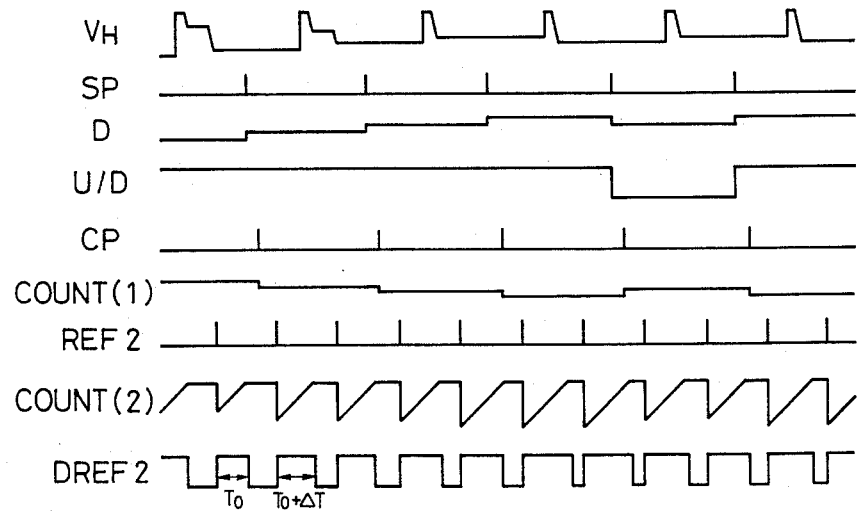
FIG. 7 is a diagram of waveforms at principal parts in the arrangement of FIG. 6.
Figure 8:
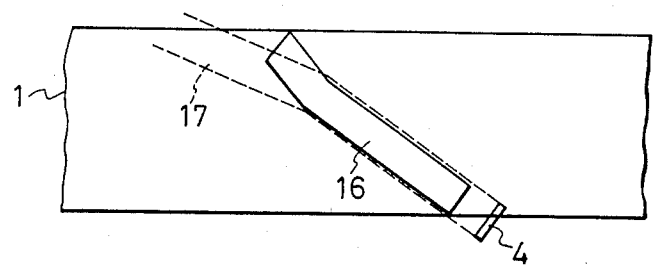
FIG. 8 is a diagram showing the correlation between the pattern of a magnetic tape and the scanning locus of a video head in a prior art.
Figure 9:
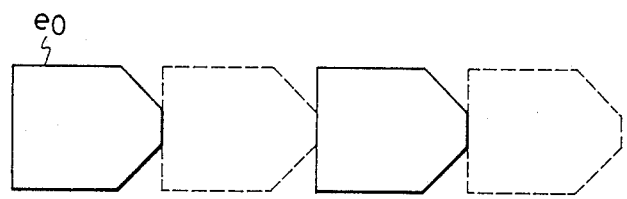
FIG. 9 is a diagram of the output waveform of the video head on the occasion of FIG. 8.

Referring to FIGS. 6 and 7, the output $V_H$ of the detector 12 is sampled as a digital quantity D by the ADC circuit 29 at a proper timing (the timing of the output SP of the control pulse generator 34). The digital quantity D is alternately applied to the memories 31 and 32. The values of the digital quantity D ($t=t_n$) and the digital quantity D ($t=t_{n-1}$) are decided by the magnitude decision unit 32 as to whether the digital quantity D has increased or decreased (a case where both the digital quantities are equal may be included in either the increase or the decrease). The result of the decision is input as an up/down switching input signal U/D for the counter 33. In synchronism with such cycles, the clock inputs CP of the counter 33 are generated by the pulse generator 34. A count (1) thus obtained is supplied the initial value of the counter 36 which constitutes the tracking adjustment circuit 9. The counter 36 operates using as its input clock the output of the clock pulse generator 35 which generates a reference clock of highy precision oscillated by a crystal or the like, and it begins to count using the output $REF_2$ of the reference signal generator 8 as preset pulses. Additionally, when the count has reached a predetermined value, the counter 36 delivers the output $DREF_2$ and simultaneously stops counting. In this way, the operation of the tracking adjustment circuit illustrated in FIG. 7 is attained.

According to the present invention, as the basic performance of an automatic tracking system, the best tracking state which is not inferior to a tracking state based on manual setting can be realized even for the curves etc. of recording tracks particular to tapes recorded by various sorts of apparatuses. Further, tracking means for setting the best tracking state is put to a digital setup, whereby a more stabilized automatic tracking system for a magnetic recording and reproducing apparatus can be provided.

What is claimed is:

1. An automatic tracking system for a magnetic recording and reproducing apparatus, comprising:
   tracking adjusting means for changing a phase of a scanning locus of a rotary head in a widthwise direction of a track, said rotary head reproducing the track recorded by a helical scan system;
   first detector means for detecting an envelope of a reproduced signal provided from said rotary head;
   second detector means for detecting the minimum value of an output of said first detector means within one rotational cycle of said rotary head; and
   data processing circuit means for controlling said tracking adjustment means so that the minimum value detected by said second detector means converges on a maximum value thereof.

2. An automatic tracking system according to claim 1, wherein said second detector means has a time constant greater than a time constant of said first detector means.

* * * * *